(12) United States Patent
Boen et al.

(10) Patent No.: US 7,658,904 B2
(45) Date of Patent: Feb. 9, 2010

(54) PROCESS FOR THE PRODUCTION OF HYDROGEN BY THE THERMOCHEMICAL ROUTE, BASED ON THE HYDROCHLORINATION OF CERIUM

(75) Inventors: Roger Boen, Quartier les Gazelles (FR); Christophe Girold, Piolenc (FR); Florent Lemort, Villeneuve les Avignon (FR); Vlatko Materic, Toulouse (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/793,895

(22) PCT Filed: Dec. 20, 2005

(86) PCT No.: PCT/FR2005/051117
§ 371 (c)(1), (2), (4) Date: May 9, 2008

(87) PCT Pub. No.: WO2006/070153
PCT Pub. Date: Jul. 6, 2006

(65) Prior Publication Data
US 2008/0311026 A1    Dec. 18, 2008

(30) Foreign Application Priority Data
Dec. 23, 2004    (FR) .................................. 04 53209

(51) Int. Cl.
C01B 7/01    (2006.01)
C01B 3/08    (2006.01)

(52) U.S. Cl. .......................... 423/481; 423/657; 423/53; 423/492; 204/157.8

(58) Field of Classification Search .................. 423/481, 423/53, 492, 657; 204/157.48
See application file for complete search history.

(56) References Cited

U.S. PATENT DOCUMENTS
2002/0108404 A1 *    8/2002    Burke et al. ................... 65/422

FOREIGN PATENT DOCUMENTS
JP    52021293    *    2/1977

OTHER PUBLICATIONS
Jiro et al. "Rare earth elements. IX. Preparation of anhydrous rare earth chlorides", Denki Kagaku (1964), 32(2), 109-16.*

(Continued)

*Primary Examiner*—Roy King
*Assistant Examiner*—Rebecca Lee
(74) *Attorney, Agent, or Firm*—Brinks Hofer Gilson & Lione (57) ABSTRACT

Process for the production of hydrogen by the thermochemical route from water, based on the chlorine/cerium cycle, in which, according to a first reaction scheme, the following reactions are carried out:

$$H_2O + Cl_2 = 2HCl + \tfrac{1}{2}O_2; \tag{A}$$

$$8HCl + 2CeO_2 = 2CeCl_3 + Cl_2 + 4H_2O; \tag{B}$$

$$2CeCl_3 + 4H_2O = 2CeO_2 + 6HCl + H_2; \tag{C}$$

or in which, according to a second reaction scheme, the following reactions are carried out:

$$H_2O + Cl_2 = 2HCl + \tfrac{1}{2}O_2; \tag{A}$$

$$8HCl + 2CeO_2 = 2CeCl_3 + Cl_2 + 4H_2O; \tag{B}$$

$$2CeCl_3 + 2H_2O = 2CeOCl + 4HCl; \tag{B'}$$

$$2CeOCl + 2H_2O = 2CeO_2 + 2HCl + H_2; \tag{C'}$$

and in which the reaction (B) for the chlorination of cerium oxide is carried out in the liquid phase, the cerium chloride passing into solution.

28 Claims, 3 Drawing Sheets

OTHER PUBLICATIONS

Bamberger et al., "Hydrogen production from water by thermochemical cycles," Cryogenics, vol. 16, pp. 197-208 (Apr. 1976).

Bamberger, "Hydrogen production from water by thermochemical cycles; a 1977 update," Cryogenics, vol. 18, pp. 170-183 (Mar. 1978), search report.

Onstott, "Thermosplitting of Hydrochloric Acid for Hydrogen Production with Cerium Dioxide as the Recycle Reagent," J. Phys. Chem., vol. 98, No. 51, pp. 13541-13545 (1994), search report.

Onstott, "Cerium Dioxide as a Recycle Reagent for Thermochemical Hydrogen Production by Splitting Hydrochloric Acid Into the Elements," Int. J. Hydrogen Energy, vol. 22, No. 4, pp. 405-408 (1997), search report.

Hollabaugh et al., "A Study of the Cerium-Chlorine System for Thermochemical Production of Hydrogen," Proc. 2WHEC, vol. 2, pp. 809-828 (Aug. 1978).

\* cited by examiner

PROCESS FOR THE PRODUCTION OF HYDROGEN BY THE THERMOCHEMICAL ROUTE, BASED ON THE HYDROCHLORINATION OF CERIUM

TECHNICAL FIELD

The invention relates to a process for the production of hydrogen by the thermochemical route which is based on the cerium hydrochlorination cycle.

The technical field of the invention can be generally defined as that of the production of hydrogen from water employing thermochemical cycles, in other words the invention lies in the field of the production of hydrogen based on the thermal decomposition of water assisted by "thermodynamic catalysts".

The production of hydrogen by the use of thermochemical cycles is a field which has been widely studied since the end of the 1960s and has formed the subject of a systematic evaluation of the elements which may be employed.

Among these thermochemical cycles, the cycles for the production of hydrogen based on the oxidation/reduction of cerium and in particular on the cerium/chlorine system have attracted attention.

The thermochemical cycle based on the oxidation/reduction of cerium can be described by the following reactions, according to a first alternative form:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 4H_2O = 2CeO_2 + 6HCl + H_2; \quad (C)$$

According to a second alternative form, this thermochemical cycle can be described by the following reactions:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 2H_2O = 2CeOCl + 4HCl; \quad (B')$$

$$2CeOCl + 2H_2O = 2CeO_2 + 2HCl + H_2; \quad (C')$$

The document by C. E. Bamberger, "Hydrogen Production from Water by Thermochemical Cycles", Cryogenics, March 1978, pp. 170-182 [1], gives a list of 129 thermochemical cycles which formed the subject of publications between October 1975 and September 1977. This document supplements a first list of 72 thermochemical cycles which appeared in 1976 in the document by Bamberger C. E. and Richardson D. M., Cryogenics, 16 (1976), p. 197 [2].

Mentioned among these 129 cycles are the cycles involving cerium chloride according to the two alternative forms mentioned (cycles Nos. 30 and 31, p. 173, of the first document by Bamberger).

The document by C. M. Hollabaugh, E. I. Onstott, T. C. Wallace Snr. and M. G. Bowman, "A study of the cerium-chlorine system for thermochemical production of hydrogen" [3], gives a detailed study of the cycle involving cerium chloride.

The document by C. M. Hollabaugh is concerned with the second alternative form of the cycle with cerium chloride and in particular with the final three reactions (B), (B') and (C') of the cycle, which are mentioned above.

These reactions are all heterogeneous reactions in which a gas (HCl or $H_2O$) comes into contact with a solid ($CeO_2$, $CeCl_3$ or CeOCl), reacts with it and converts it into a solid product ($CeCl_3$, CeOCl or $CeO_2$). The first reaction, (A), which was not studied in the document by Hollabaugh, for its part only involves gases.

The fact that the reactions involved are, in this document, all carried out in the solid/gas phase or in the gas/gas phase results, inter alia, in the following difficulties and problems:

a limitation on the degrees of progression of the reactions by passivation of the surfaces; thus, the studies carried out by Hollabaugh et al. [3] show that, at best, a coefficient of progression of 0.3 is achieved after 50 minutes;

a limitation on the reaction kinetics by the diffusion of the gaseous entities within the solids;

a heating of solid particles which is sometimes difficult to bring about;

several transportations of solids to be employed in order to convey the entities from one reactor to the other;

a significant modification in the molar volumes of the solids $CeO_2$ and $CeCl_3$ with an increase of 260% between the two, the consequence of which is that the stability of the conversion reactors is difficult to maintain.

The same problems are posed as regards the first alternative form of the cerium thermochemical cycle, which involves the same reactions (A) and (B).

It is concluded therefrom that fundamental problems are posed during the use of the cycle for the oxidation/reduction of cerium, both in its first alternative form and in its second alternative form, in terms of reactivity and of management of the process.

It thus results from the above that there exists a need for a process for the production of hydrogen by the thermochemical route from water, based on the oxidation/reduction of cerium, which makes it possible to obtain a high degree of progression in a shorter time and which exhibits high kinetics.

There also exists a need for such a process which can be easily controlled, in particular in terms of management of the reactivity.

There also exists a need for a process which is simple, reliable, safe and easy to implement, in particular as regards transfers of heat and of matter.

The aim of the present invention, inter alia, is to provide a process for the production of hydrogen by the thermochemical route from water, based on the oxidation/reduction of cerium and more specifically on the cerium/chlorine cycle, which meets, inter alia, the needs listed above, which does not exhibit the disadvantages, defects, limitations and drawbacks of the processes of the prior art and which solves the problems of the processes of the prior art, such as those described in particular in the abovementioned documents [1], [2] and [3].

This aim and yet others are achieved, in accordance with the invention, by a process for the production of hydrogen by the thermochemical route from water, based on the chlorine/cerium cycle, in which, according to a first reaction scheme, the following reactions are carried out:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 4H_2O = 2CeO_2 + 6HCl + H_2; \quad (C)$$

or, according to a second reaction scheme, the following reactions are carried out:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 2H_2O = 2CeOCl + 4HCl; \quad (B')$$

$$2CeOCl + 2H_2O = 2CeO_2 + 2HCl + H_2; \quad (C')$$

and in which the reaction (B) for the reduction of cerium is carried out in the liquid phase, the cerium chloride passing into solution.

Advantageously, the reaction (A) for the reduction of chlorine is carried out with an excess of water with respect to the stoichiometry of the reaction.

Advantageously, in the reaction (A), the water is in excess with respect to the stoichiometry by a factor which can range up to 20, preferably from 1 to 10.

The reaction (A) is generally carried out in the gas phase at a temperature from 500 to 1000° C., for example 700° C.

Advantageously, the reaction (A) can be assisted by UV irradiation.

Advantageously, in the first reaction scheme, the reaction (B) is carried out with an excess of HCl with respect to the stoichiometry of the reaction.

Advantageously, in the first reaction scheme, the reaction (B) is carried out with an excess of hydrochloric acid by a factor of 1 to 4, for example 1.5, with respect to the stoichiometry.

Advantageously, the reaction (B) is carried out in a hydrochloric acid solution brought to a temperature of 30 to 110° C., for example 110° C.

The aqueous acidic cerium chloride solution which, in the first reaction scheme, is produced by the reaction (B) is atomized in the reaction (C) using pressurized steam, by means of which the cerium chloride is hydrolysed to give solid $CeO_2$.

According to the first reaction scheme, the reaction (C) is advantageously carried out at a temperature from 600 to 1000° C., for example 750° C.

The aqueous acidic cerium chloride solution produced by the reaction (B) is, in the second reaction scheme, evaporated and vaporized in the reaction (B') to give solid cerium oxychloride CeOCl.

Advantageously, the reaction (B') is carried out at a temperature from 100 to 300° C., for example 130° C.

Advantageously, the reaction (C') for hydrolysis of cerium oxychloride is carried out using steam, optionally under pressure, by means of which the cerium oxychloride is hydrolysed to give solid $CeO_2$.

The reaction (C) of the first reaction scheme or the reaction (C') of the second reaction scheme produces a mixture of gases, namely HCl and $H_2$, and of solid $CeO_2$, from which, advantageously, the hydrogen is separated by condensation. Prior to the said condensation, it is optionally possible to carry out a gas/solid separation operation to separate the solid $CeO_2$ from the gases.

Advantageously, the solid $CeO_2$ and the gases other than hydrogen are conveyed to the reaction (B).

Advantageously, the reactions (C) and (C') are carried out with an excess of water with respect to the stoichiometry.

The reaction (A) of the first reaction scheme and of the second reaction scheme produces a gaseous mixture of HCl and of oxygen from which the oxygen is separated by condensation.

Advantageously, the water formed during the reaction (B) is separated by distillation.

Advantageously, the water separated by distillation is conveyed with the gaseous chlorine formed and optionally with the excess hydrochloric acid to a condensation stage in which the chlorine, on the one hand, and the water and optionally the excess hydrochloric acid, on the other hand, are recovered.

Advantageously, the water recovered in the abovementioned condensation stage is conveyed to the reaction (C) or (C') and the chlorine and optionally the excess hydrochloric acid are conveyed to the reaction (A).

Advantageously, the energy recovered during the condensations is used to provide for the vaporizations and the distillation and optionally to supply a turbine if any residual energy still remains available.

The process according to the invention can in a simplified way be described as a "cerhydrochlorine" process for the production of hydrogen based on the cerium/chlorine thermochemical cycle with passage via the aqueous route.

This is because the process according to the invention, both in the first reaction scheme and in the second reaction scheme, differs fundamentally from the processes of the prior art [3] employing the same cerium/chlorine system in the sense that the reaction (B) is carried out in the liquid phase and not in the solid/gas phase.

The other reactions involved in the first reaction scheme, namely the reaction (A) and the reaction (C), are gas-phase reactions.

The process according to the invention in the first reaction scheme thus does not involve any reaction in the solid/gas phase with all the disadvantages which this comprises.

In the case of the second reaction scheme, the reaction (B') is a solid/gas reaction but in which the passivation of the solids is limited and the kinetics acceptable.

The process according to the invention defines a thermochemical cycle for the production of hydrogen providing maximum progression of the reactions involved in each of the cycles due to the coupling within the same process scheme of a liquid-phase reaction and of gas-phase reactions.

The process according to the invention, in particular the process involving the first reaction scheme, does not exhibit the disadvantages, defects, limitations and drawbacks of the processes of the prior art and provides a solution to the problems listed above and presented by the processes of the prior art, such as that described in the document by Hollabaugh [3].

This is because, due to the fact that the reaction (B) is carried out in the liquid phase, complete stripping of the solids ($CeO_2$) introduced into the system is ensured. Consequently, the transportation of the cerium chloride formed during the reaction (B) to the subsequent stages, namely the reaction (C) of hydrolysis of cerium chloride in the case of the first reaction scheme or the hydrolysis reaction (B') in the case of the second reaction scheme, is also carried out in the liquid phase, which can be implemented very simply.

Carrying out the reaction (B) in the liquid phase, according to the invention, results in dissolution of the reaction products in the reaction (B), which precludes passivation and forces the progression as far as 1. Experimental results have demonstrated that it is possible, for example, to thus achieve a progression of the reaction of 0.90 in 40 minutes.

Diffusion of the gases into solids does not exist in the reactions (A) and (B) and is thus not a limiting factor.

In the case of the reaction (C), hydrolysis takes place directly via the atomization of an acidic cerium chloride solution assisted by pressurized steam. This atomization brings about the formation of micron-sized drops, for example in an oven brought to the reaction temperature. Local vapour pressures make it possible to retain a gaseous reaction environment and gas/solid diffusion is thus greatly restricted.

The solids produced in the process are cyclically dissolved; there is no surface passivation.

The transportation of solids is limited to the transition from the reaction (C) to the reaction (B) with recycling of the $CeO_2$.

The cerium chloride $CeCl_3$ is always in solution; for this reason, the problems of change in molar volume no longer exist.

In the case of the second reaction scheme, the evaporation stage (B') in which $CeCl_3$ is converted into CeOCl adds a transportation of solid and a solid/gas reaction, which it would have been possible to believe might be limited by the diffusion of the gases into the solids.

The contraction ("striction") resulting from the conversion of the CeOCl into $CeO_2$ limits the passivation of the solid reactants and allows acceptable kinetics.

The invention will be better understood on reading the detailed description which follows, made with reference to the appended drawings, in which.

The diagram of the process according to the invention employing a cycle corresponding to the first reaction scheme mentioned above is represented in FIG. 1.

Figure 1:
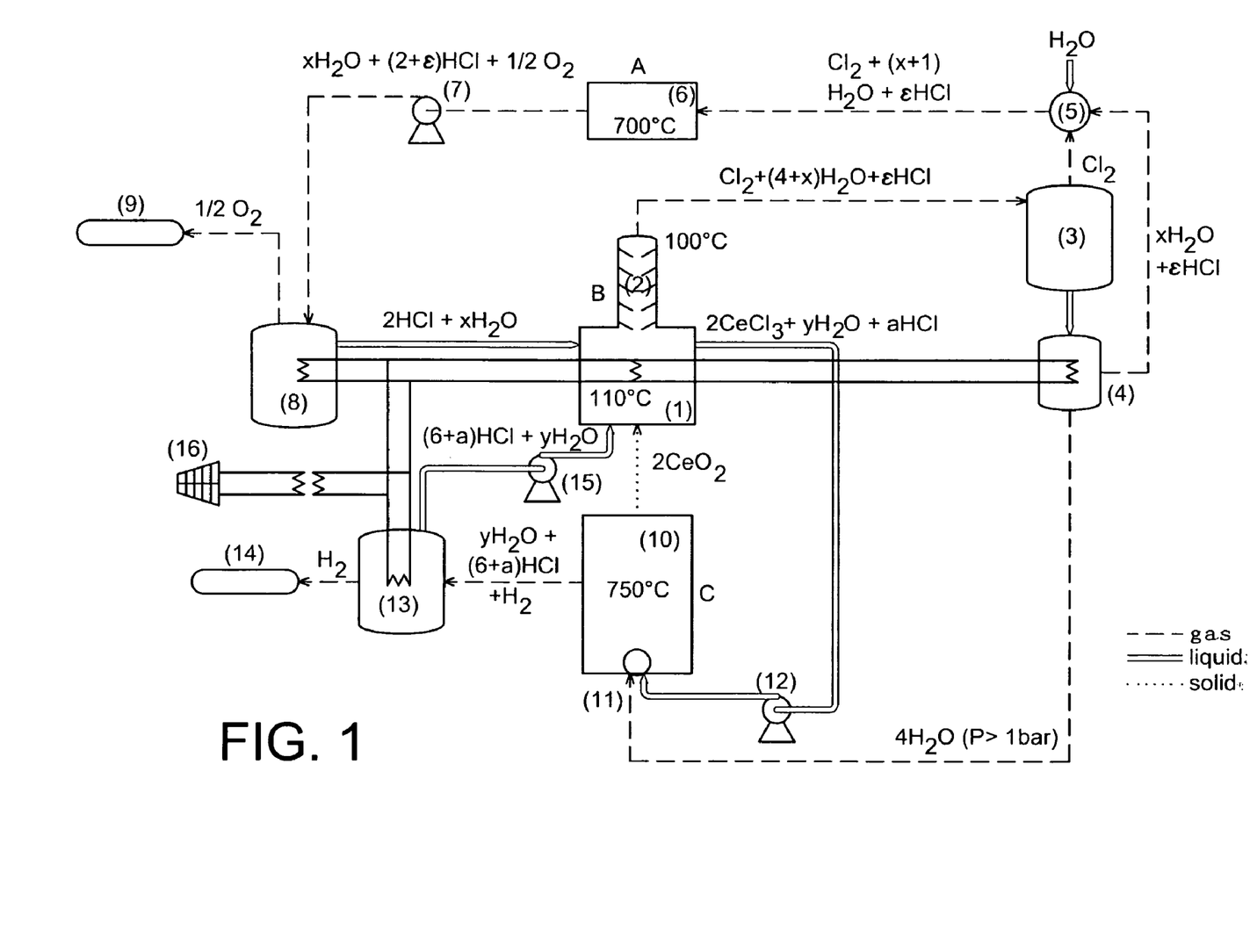
FIG. 1 is a diagram of the process according to the invention employing the first reaction scheme.

The process comprises stages involving the abovementioned reactions (A), (B) and (C).

The reaction (B) is carried out in a reactor where the hydrochlorination of cerium oxide is provided in the liquid phase.

This hydrochlorination reaction, which consumes hydrochloric acid and produces water, is carried out in the bottom part (1) of the said reactor at a temperature from 30 to 110° C., for example 110° C.

The water is distilled off continuously using a reflux column (2) generally operating at a temperature of 100° C. which generally forms the upper part of the reactor.

At the top of the distillation column, a stream comprising water, chlorine and traces of HCl, that is to say a stream having the composition $Cl_2+(4+x)H_2O+\epsilon HCl$ (where x represents the overstoichiometry in $H_2O$ of the reaction (A)), is conveyed to a condenser (3).

Figure 2:
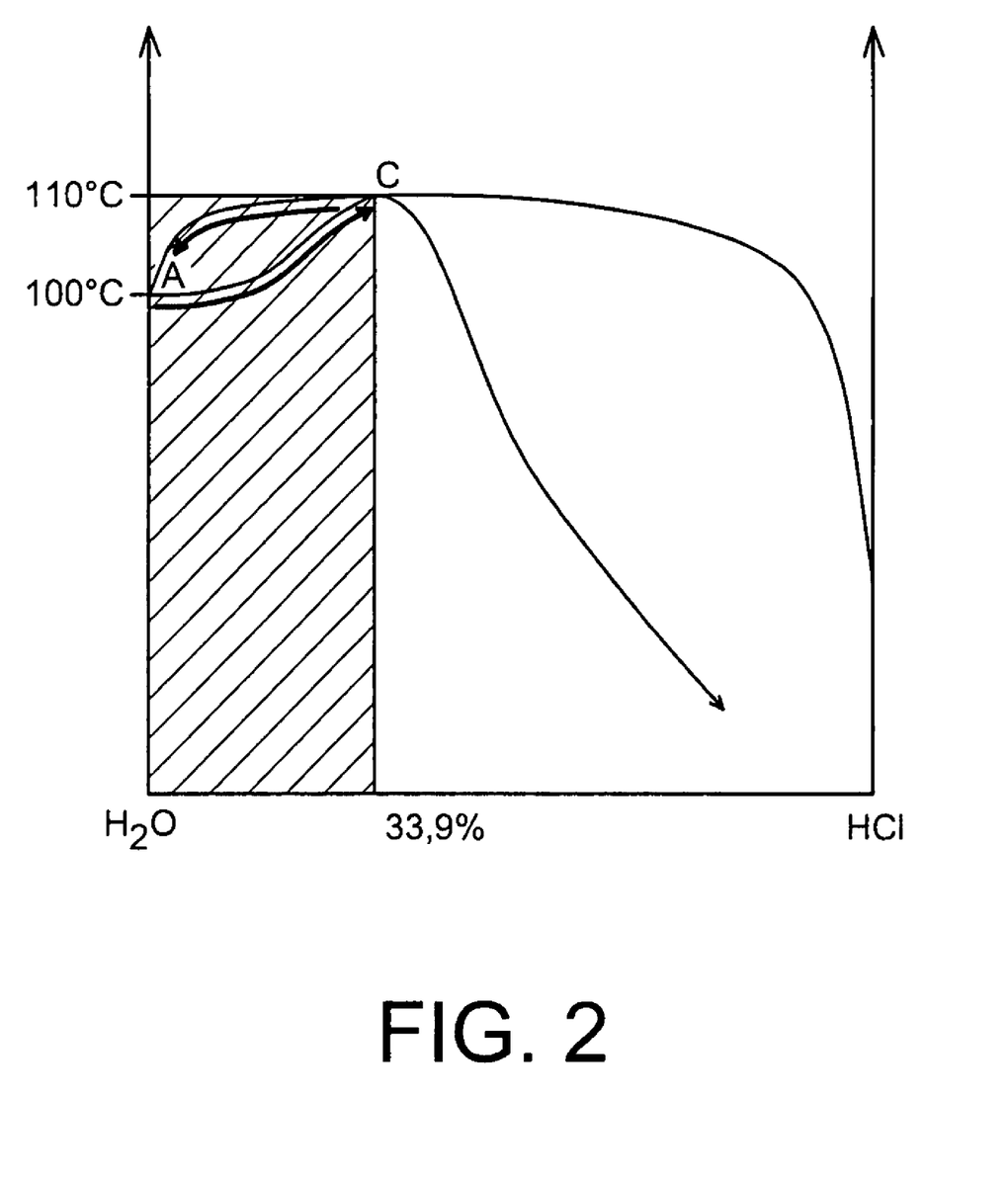
FIG. 2 is a graph representing the $H_2O/HCl$ phase diagram. The temperature (in ° C.) is carried on the ordinate and the percentage by weight of water is carried on the abscissa.

The reaction (A) has to have water which is as pure as possible, which makes it necessary to operate on the water-rich side of the $H_2O/HCl$ azeotrope, as is indicated in FIG. 2, where the region of the $H_2O/HCl$ phase diagram in which the process of the invention is preferably made use of is represented by hatching. The distillation ensures, on the one hand, that a gas is obtained at the top of the column which has a composition which allows it to be conveyed to the reaction (A) (point A on the vaporization curve of FIG. 2) and, on the other hand, an enriching in HCl of the liquid towards an azeotropic solution which can be directed to the reaction (C) (point C on the dewpoint curve of FIG. 2).

The process is governed by the HCl stoichiometry used during the reaction (B).

According to the invention, the reaction (B), in the first reaction scheme, is generally carried out with an excess of HCl with respect to the stoichiometry. Preferably, in the first reaction scheme, the reaction (B) is carried out with an excess of hydrochloric acid by a factor of 1 to 4 with respect to the stoichiometry.

Experience has shown that a ratio of 1.5, for example, is acceptable since it makes it possible to obtain acceptable chlorination kinetics with, for example, a progression of approximately 1 in 40 minutes.

The use of an azeotropic solution (comprising 33.9% by weight of HCl: see FIG. 2) or optionally a subazeotropic solution makes it possible to have the overstoichiometry in $H_2O$ (represented in the process diagram or flow diagram of FIG. 1) necessary for a maximum progression of the reaction (C).

In order to provide for maximum progression of the reaction (A) in order to dispense with the installation of an $O_2/Cl_2$ separation system, it is necessary to operate with a high overstoichiometry (x on the flow diagram) in $H_2O$, the latter being able to reach a factor 20 and preferably lying in the range from 1 to 10.

The reactivity can be improved by using UV radiation, which makes possible homolytic dissociation.

On the assumption that it would be possible to have available membranes which can separate $O_2$ and $Cl_2$, this overstoichiometry might be lowered by a factor 10.

The excess water originating from the reaction (A) is cycled between the reactors (6) and (1) for respectively the reaction (A) and the reaction (B). In the reactor (1), it is subjected to a distillation (2) in conjunction with the water resulting from the reaction (B).

The stream resulting from the distillation column (2), comprising water $((4+x)H_2O)$, chlorine ($Cl_2$) and traces of hydrochloric acid ($\epsilon HCl$), is conveyed to a condenser (3) operating at a temperature generally from 70 to 100° C., which makes it possible to separate $Cl_2$ (gas) from $H_2O$ (liquid).

The liquid water separated is transferred into an evaporator (4) in which the water is heated to a temperature generally of 150° C., thus generating a vapour having a pressure generally of approximately 4.5 bar.

A portion of this water in the form of a gas stream with the composition $xH_2O+\epsilon HCl$ is conveyed from the evaporator (4) to a pressure-reducing mixer (5) which also receives a liquid stream of make-up water necessary for the production of hydrogen and a gaseous chlorine stream resulting from the condenser (3).

A gas stream with the composition $Cl_2+(x+1)H_2O+\epsilon HCl$ leaves the pressure-reducing mixer (5) and is introduced into a reactor (6) in which the reaction (A) for the production of HCl is carried out. This reaction is a gas-phase reaction generally carried out at a temperature from 500 to 1000° C., for example 700° C.

A gas stream with the composition $xH_2O+(2+\epsilon)HCl+\frac{1}{2}O_2$ emerges from the reactor (6) for the reaction (A) and is conveyed into a condenser (8).

A possible alternative form might be to introduce the water in the liquid form into the reactor (6) in order to limit the volumes of gas transported.

The effect of the condensation may be sufficient to bring the gases to the condenser (8). However, a booster pump (7) may be necessary.

In the condenser (8), on the one hand, a stream of oxygen is produced, which is the only gas emitted at this stage, and, on the other hand, a liquid stream composed of a mixture with the composition $(2+\epsilon)HCl+xH_2O$ is produced which is fed back to the reactor (1).

An exchanger placed inside the condenser (8) makes it possible to transfer the heat resulting from the cooling carried out to the reactor (1) and the evaporator (4).

The stream of oxygen ($\frac{1}{2}O_2$) recovered in the condenser (8) is conveyed to a storage tank (9).

The other part of the water resulting from the evaporator (4) forms a gas stream with the composition $4H_2O$ which is conveyed under pressure (pressure greater than 1 bar) to a reactor (10) in which the reaction (C) is carried out.

The reactor (10) also receives a liquid stream composed of an acidic $CeCl_3$ solution, with the composition $2CeCl_3+yH_2O+aHCl$, resulting from the reactor (1) which is conveyed in the liquid form to the reactor (10) by means of a pump (12).

More specifically, the pressurized water stream is conveyed into an atomizer (11) placed at the base of the reactor (10), the said atomizer also being supplied with the $CeCl_3$ solution.

The liquid/vapour coupling inside the atomizer (11) makes it possible to very finely disperse the solution in the reactor (10), which is generally heated at a temperature from 600 to 1000° C., for example from 700° C. to 750° C.

The gases emitted from the reactor (10) form a stream, with the composition $yH_2O+(6+a)HCl+H_2$, which is conveyed into a condenser (13), where it is separated, on the one hand, into a gaseous hydrogen stream and, on the other hand, into a liquid stream with the composition $(6+a)HCl+yH_2O$.

The gaseous hydrogen stream ($H_2$) recovered in the condenser (13) is conveyed into a storage tank (14).

The condenser (13) is equipped with an exchanger which makes it possible to transfer the heat to the reactors (1) and (4).

The liquid stream resulting from the condenser (13) is conveyed to the reactor (1) via a pump (15).

The reaction (C) carried out in the reactor (10) also produces solid $CeO_2$ which generally has to be separated from the gases. The gas/solid separation at the outlet of the reactor (10) can be carried out, for example, by a device of the cyclone type.

This gas/solid separation may be optional, since, at this stage, all the solids and gases produced in the reactor (10), with the exception of the hydrogen, are conveyed to the reactor (1).

It is thus possible to make do with condensing the hydrogen from the gas/solid mixture resulting from the reactor (10) without carrying out a solid/liquid separation at the outlet of the latter.

In conclusion, the reactor (1), which constitutes the heart of the plant for carrying out the process according to the invention, is thus supplied by a liquid stream with the composition $(8+a)HCl+(x+y)H_2O$ and a solid stream with the composition $2CeO_2$, while a gas stream with the composition $Cl_2+(4+x)H_2O+\epsilon HCl$ and a liquid stream or aqueous acidic solution with the composition $2CeCl_3+yH_2O+aHCl$ exit from the reactor (1) or more specifically, as regards the gas stream, from the distillation column (2) situated at the top of the said reactor.

The requirement of using solutions comprising as little as possible of hydrochloric acid in the reactor (10) can be satisfied by operating several reactors (1) in parallel, for example 2 to n reactors, depending on the hydrogen throughput to be produced.

In FIG. 1, the heat recovered in the condensers (8) and (13) is used to supply the reactor (1), in order to carry out the distillation of the water, the evaporator (4) and optionally a turbine (16).

The process diagram according to the invention employing a cycle corresponding to the second reaction scheme mentioned above is represented in FIG. 3.

Figure 3:
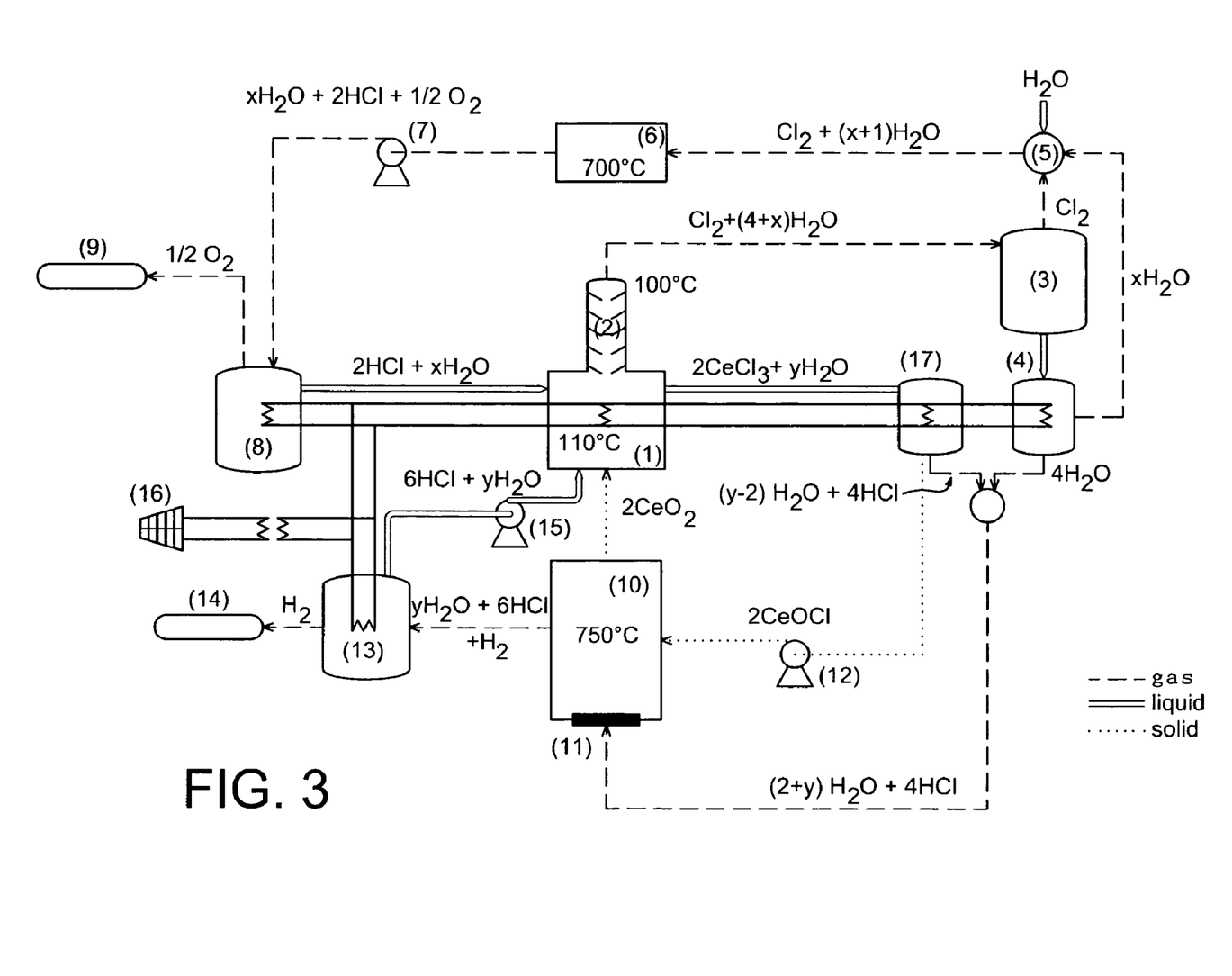
FIG. 3 is a diagram of the process according to the invention employing the second reaction scheme.

It exhibits numerous similarities to the process diagram employing a cycle corresponding to the first reaction scheme as described in FIG. 1.

The reaction (B) carried out in the reactor (1) is identical to that described in the case of the diagram of FIG. 1, with the sole difference that the operation is carried out with amounts of material which are close to the stoichiometry, which produces a $CeCl_3$ solution which is much less acidic than that produced in the case of the first reaction scheme of FIG. 1.

This solution forms a liquid stream with the composition $2CeCl_3+yH_2O$ which exits from the reactor (1) to be conveyed to an evaporator (17), at the outlet of which, on the one hand, a stream of solid with the composition $2CeOCl$ is collected and, on the other hand, a liquid stream, composed of an acidic aqueous solution with the composition $(y-2)H_2O+4HCl$, is collected.

The stream of solid CeOCl collected at the outlet of the evaporator (17) is transferred to the reactor (10) via the pump (12). It is treated in the reactor (10) by the combined stream of vapour with the composition $(2+y)H_2O+4HCl$ originating from the combination of the stream with the composition $(y-2)H_2O+4HCl$ resulting from the evaporator (17) and of the stream with the composition $4H_2O$ resulting from the evaporator (4). The solids (stream with the composition $2CeO_2$) optionally separated from the stream of gas follow the same path as in FIG. 1 and are conveyed into the reactor (1).

The said stream with the composition $(2+y)H_2O+4HCl$ is introduced into the reactor (10) using a diffuser (11).

A gas stream with the composition $Cl_2+(4+x)H_2O$ (and no longer $Cl_2+(4+x)H_2O+\epsilon HCl$, as in FIG. 1) is produced at the top of the distillation column (2) and is conveyed to the condenser (3) in order to separate the $Cl_2$ (gas).

Owing to the fact that overstoichiometry in HCl is not used to carry out the reaction (B) in the reactor (1), the compositions of the streams consequently have to be corrected with respect to those given in connection with FIG. 1. Thus, the gas stream from the evaporator (4) to the pressure-reducing mixer (5) has the composition $xH_2O$, the gas stream from the pressure-reducing mixer (5) to the reactor (6) has the composition $Cl_2+(x+1)H_2O$, the gas stream from the reactor (6) to the condenser (8) via the pump (7) has the composition $xH_2O+2HCl+½O_2$, the gas stream from the reactor (10) to the condenser (13) has the composition $yH_2O+6HCl+H_2$, the liquid stream from the condenser (13) to the reactor (1) has the composition $6HCl+yH_2O$ and the liquid stream from the condenser (8) to the reactor (1) has the composition $2HCl+xH_2O$.

A turbine (16) provides an identical function to that described in FIG. 1.

The preceding description, in connection with the appended figures, demonstrates all the advantages of the process according to the invention already listed above.

Other advantages of the process according to the invention which are additionally apparent are:
- the limitation on the volume of matter transported by virtue of the condensation stages (there specifically exists a ratio of 1000 between the gas and liquid volumes);
- the limitation on the amount of solids transported;
- the separation of the gases formed by condensation, thus avoiding the use of membranes;
- the use of azeotropic solutions with excess of water which renders flexible the management of the process at the level of the distillation (2) and of hydrolysis (C) and (C') carried out in the hydrolysis reactor (10);
- the system for the recovery of heat in the condensers which is sufficient to supply heat to the reactor (1) and the evaporators. The remaining heat may make possible the feeding of a turbine (16) associated with the cycle.

The process according to the invention can be easily carried out industrially and makes possible the production of hydrogen on a large scale. The temperature levels anticipated in the process may make possible the supplying with heat of a plant employing this process by various heat sources.

These sources can, for example, be nuclear, anticipating a coupling of the plant employing the process of the invention with a nuclear reactor of HTR or VHTR type.

These sources can also be solar, in order to bring about the heating of a heat-transfer fluid capable of supplying the two high-temperature reactions (A and C).

The invention will now be described with reference to the following examples, given by way of illustration and without implying limitation.

In the examples which follow, tests relating to the reaction (B) and the associated distillation, the reaction (B') and the reaction (C) were carried out.

EXAMPLE 1

In this example, tests on the implementation of the reaction (B) were carried out.

These tests consisted in bringing into contact, in a three-necked flask heated to 110° C. surmounted by a reflux column, 47 millilitres of azeotropic HCl solution with 8 milligrammes of $CeO_2$, which corresponds to 1.5 times the stoichiometry necessary for the total chlorination of the cerium.

From this test, it was possible to demonstrate the possibility of achieving a reaction progression of 0.9 in 40 minutes.

During the use of a stoichiometric mixture, several hours are necessary to achieve a progression of 0.9.

EXAMPLE 2

In this example, tests on the implementation of the distillation associated with the reaction (B) were carried out.

These tests consisted in bringing into contact, in a three-necked flask heated to 110° C. surmounted by a Vigreux column, 31 millilitres of azeotropic HCl solution with 8 milligrammes of $CeO_2$, which corresponds to a stoichiometric mixture, so that all the $CeO_2$ reacts with the chloride ions.

The possibility has been demonstrated, from this test, of recovering 95% of the water formed during the chlorination of the cerium oxide.

The pH of the recovered water was then 2, demonstrating a very low amount of HCl in solution ($10^{-2}$ mol.l$^{-1}$ against 6.6 mol.l$^{-1}$ in the reactor, i.e. a ratio of 660), which should only slightly disturb the reaction (A).

EXAMPLE 3

In this example, tests on the implementation of the reaction (B') were carried out.

These tests consisted in dissolving approximately 4 grammes of $CeCl_3$ in 40 millilitres of water in a round-bottomed flask heated to 150° C. and in bringing the mixture to boiling until it had completely evaporated.

The insoluble residues recovered correspond to cerium oxychloride CeOCl.

This overall reaction has kinetics limited by the evaporation time.

EXAMPLE 4

In this example, tests on the implementation of the reaction (C) were carried out.

These tests consisted in atomizing a 0.2M $CeCl_3$ solution in a tubular reactor heated to 700° C.

Atomization takes place by virtue of a jet of steam under a pressure of approximately 2 bar.

After having demonstrated the possibility of atomizing the solution, the measurements downstream of the oven made it possible to observe a very rapid production of hydrogen.

The invention claimed is:

1. A process for the production of hydrogen by the thermochemical route from water, based on the chlorine/cerium cycle, in which, according to a first reaction scheme, the following reactions are carried out:

$$H_2O+Cl_2=2HCl+\tfrac{1}{2}O_2; \quad (A)$$

$$8HCl+2CeO_2=2CeCl_3+Cl_2+4H_2O; \quad (B)$$

$$2CeCl_3+4H_2O=2CeO_2+6HCl+H_2; \quad (C)$$

or in which, according to a second reaction scheme, the following reactions are carried out:

$$H_2O+Cl_2=2HCl+\tfrac{1}{2}O_2; \quad (A)$$

$$8HCl+2CeO_2=2CeCl_3+Cl_2+4H_2O; \quad (B)$$

$$2CeCl_3+2H_2O=2CeOCl+4HCl; \quad (B')$$

$$2CeOCl+2H_2O=2CeO_2+2HCl+H_2; \quad (C')$$

and in which the reaction (B) for the chlorination of cerium oxide is carried out in the liquid phase, the cerium chloride passing into solution.

2. The process according to claim 1, wherein the reaction (A) for the reduction of chlorine is carried out with an excess of water with respect to the stoichiometry.

3. The process according to claim 1, wherein the water is in excess with respect to the stoichiometry by a factor ranging up to 20.

4. The process according to claim 1, wherein the water is in excess with respect to the stoichiometry by a factor of from 1 to 10.

5. The process according to claim 1, wherein the reaction (A) is carried out in the gas phase at a temperature from 500° C. to 1000° C.

6. The process according to claim 1, wherein the reaction (A) is carried out in the gas phase at a temperature of 700° C.

7. The process according to claim 1, wherein the reaction (A) is assisted by UV irradiation.

8. The process according to claim 1, wherein reaction (B) of the first reaction scheme is carried out with an excess of HCl with respect to the stoichiometry of the reaction.

9. The process according to claim 8, wherein reaction (B) of the first reaction scheme is carried out with an excess of hydrochloric acid by a factor from 1 to 4 with respect to the stoichiometry.

10. The process according to claim 8, wherein reaction (B) of the first reaction scheme is carried out with an excess of hydrochloric acid by a factor of 1.5 with respect to the stoichiometry.

11. The process according to claim 1, wherein the reaction (B) is carried out in a hydrochloric acid solution brought to a temperature from 30° C. to 110° C.

12. The process according to claim 1, wherein the reaction (B) is carried out in a hydrochloric acid solution brought to a temperature of 110° C.

13. The process according to claim 1, further comprising atomizing the aqueous acidic cerium chloride solution produced in reaction (B) of the first reaction scheme in reaction (C) using pressurized steam, wherein the cerium chloride is hydrolysed to give solid $CeO_2$.

14. The process according to claim 13, wherein the reaction (C) is carried out at a temperature from 600° C. to 100° C.

15. The process according to claim 13, wherein the reaction (C) is carried out at a temperature of 750° C.

16. The process according to claim 1, wherein the reaction (B) produces an aqueous acidic cerium chloride solution which, in the second reaction scheme, is vaporized in the reaction (B') to give solid cerium oxychloride CeOCl.

17. The process according to claim 16, wherein the reaction (B') is carried out at a temperature from 100° C. to 300° C.

18. The process according to claim 16, wherein the reaction (B') is carried out at a temperature of 130° C.

19. The process according to claim 1, wherein the reaction (C') for hydrolysis of the cerium oxychloride is carried out using steam, wherein the cerium oxychloride is hydrolysed to give solid $CeO_2$.

20. The process according to claim 1, further comprising separating by condensation the hydrogen from the mixture of gases and of the solid $CeO_2$ produced from the reaction (C) of the first reaction scheme or the reaction (C') of the second reaction scheme, optionally after separation of the solid $CeO_2$ from the gases.

21. The process according to claim 20, further comprising conveying the gases other than the hydrogen and the solid $CeO_2$ to the reaction (B).

22. The process according to claim 1, wherein the reactions (C) and (C') are carried out with an excess of water with respect to the stoichiometry.

23. The process according to claim 1, further comprising separating by condensation the oxygen from the gaseous mixture of HCl and of oxygen produced in reaction (A).

24. The process according to claim 1, further comprising separating by distillation the water formed during the reaction (B).

25. The process according to claim 24, further comprising conveying the water separated by distillation with the gaseous chlorine formed, and optionally with the excess hydrochloric acid, to a condensation stage, wherein the chlorine and the water, and optionally the excess hydrochloric acid, are recovered.

26. The process according to claim 25, further comprising conveying the water to the reaction (C) or the reaction (C') and conveying the chlorine and optionally the excess hydrochloric acid to the reaction (A).

27. The process according to claim 23, further comprising using energy recovered during condensations to provide vaporizations and distillation and optionally for supplying a turbine.

28. The process according to claim 25, further comprising using energy recovered during condensations to provide vaporizations and distillation and optionally for supplying a turbine.

* * * * *

UNITED STATES PATENT AND TRADEMARK OFFICE
CERTIFICATE OF CORRECTION

| | | |
|---|---|---|
| PATENT NO. | : 7,658,904 B2 | Page 1 of 1 |
| APPLICATION NO. | : 11/793895 | |
| DATED | : February 9, 2010 | |
| INVENTOR(S) | : Roger Boen et al. | |

It is certified that error appears in the above-identified patent and that said Letters Patent is hereby corrected as shown below:

ON THE TITLE PAGE OF THE PATENT
Section (75) the city of residence for Roger BOEN is --Saint Alexandre--.

Signed and Sealed this

Twenty-second Day of June, 2010

David J. Kappos
*Director of the United States Patent and Trademark Office*